United States Patent
Chatterji et al.

[11] Patent Number: 5,873,413
[45] Date of Patent: *Feb. 23, 1999

[54] METHODS OF MODIFYING SUBTERRANEAN STRATA PROPERTIES

[75] Inventors: Jiten Chatterji; David D. Onan, both of Duncan; Roger S. Cromwell, Walters; Bobby J. King; Patty L. Onan, both of Duncan, all of Okla.

[73] Assignee: Halliburton Energy Services, Inc., Duncan, Okla.

[*] Notice: This patent issued on a continued prosecution application filed under 37 CFR 1.53(d), and is subject to the twenty year patent term provisions of 35 U.S.C. 154(a)(2).

[21] Appl. No.: 914,594

[22] Filed: Aug. 18, 1997

[51] Int. Cl.$^6$ ...................................................... E21B 33/13
[52] U.S. Cl. .......................... 166/293; 166/295; 166/300; 405/264
[58] Field of Search ..................................... 166/292–295, 166/300, 285; 405/264

[56] References Cited

U.S. PATENT DOCUMENTS

| | | | |
|---|---|---|---|
| 3,082,823 | 3/1963 | Hower | 166/29 |
| 3,467,208 | 9/1969 | Kelly | 175/72 |
| 3,960,801 | 6/1976 | Cole et al. | 260/33.6 EP |
| 3,976,135 | 8/1976 | Anderson | 166/295 X |
| 4,072,194 | 2/1978 | Cole et al. | 166/295 |
| 4,215,001 | 7/1980 | Elphingstone et al. | 252/8.55 C |
| 4,272,384 | 6/1981 | Martin | 252/8.55 R |
| 4,336,842 | 6/1982 | Graham et al. | 166/276 |
| 4,483,888 | 11/1984 | Wu | 427/336 |
| 4,489,785 | 12/1984 | Cole | 166/295 |
| 4,665,988 | 5/1987 | Murphey et al. | 166/295 |
| 4,741,401 | 5/1988 | Walles et al. | 166/300 |
| 4,785,884 | 11/1988 | Arrmburster | 166/280 |
| 5,159,980 | 11/1992 | Onan et al. | 166/294 |
| 5,168,928 | 12/1992 | Terry et al. | 166/292 |
| 5,293,938 | 3/1994 | Onan et al. | 166/293 |
| 5,325,723 | 7/1994 | Meadows et al. | 73/794 |
| 5,335,726 | 8/1994 | Rodrigues | 166/295 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,373,901 | 12/1994 | Norman et al. | 166/300 |
| 5,377,757 | 1/1995 | Ng | 166/295 X |
| 5,547,027 | 8/1996 | Chan et al. | 166/295 |

FOREIGN PATENT DOCUMENTS

| | | | |
|---|---|---|---|
| WO 91/02703 | 7/1991 | WIPO | C04B 24/24 |
| WO 94/12445 | 9/1994 | WIPO | C04B 26/18 |

*Primary Examiner*—Roger Schoeppel
*Attorney, Agent, or Firm*—Craig W. Roddy; C. Clark Dougherty, Jr.

[57] ABSTRACT

The present invention provides methods of modifying the properties of a subterranean stratum penetrated by a well bore to increase the resistance of the stratum to shear failure. The methods basically include the steps of preparing a hardenable epoxy composition having flexibility upon hardening including an epoxide containing liquid or an epoxy resin and an epoxide containing liquid and a hardening agent. The epoxy composition is pumped into the subterranean stratum by way of the well bore and by way of the porosity of the stratum and then allowed to harden in the stratum.

20 Claims, No Drawings

METHODS OF MODIFYING SUBTERRANEAN STRATA PROPERTIES

BACKGROUND OF THE INVENTION

1. Field of the Invention

The present invention relates generally to methods of modifying the properties of subterranean strata, and more particularly, to methods of increasing the resistance of the strata to shear failure.

2. Description of the Prior Art

Hydraulic cement compositions are commonly utilized in oil, gas and water well completion and remedial operations. For example, hydraulic cement compositions are used in primary cementing operations whereby a string of pipe such as casing is cemented in a well bore. In performing primary cementing, a hydraulic cement composition is pumped into the annular space between the walls of the well bore and the exterior of a string of pipe disposed therein. The cement composition is permitted to set in the annular space thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented.

In some well locations, the subterranean strata into or through which wells are drilled have high permeabilities and low tensile strengths. As a result, the resistances of the strata to shear are low and they have low fracture gradients. When a well fluid such as a hydraulic cement composition is introduced into a well bore penetrating such a subterranean stratum, the hydrostatic pressure exerted on the walls of the well bore can potentially exceed the fracture gradient of the stratum and cause the formation of fractures into which the cement composition is lost. While light weight cement compositions have been developed and used, subterranean strata are still encountered which have fracture gradients too low for even the light weight cement compositions to be utilized without fractures and lost circulation problems occurring.

Thus, there are needs for methods of modifying the properties of subterranean strata penetrated by well bores to increase their resistance to shear failure, i.e., to increase the fracture gradients of the strata whereby well cements and other conventional well fluids can be utilized therein.

SUMMARY OF THE INVENTION

The present invention provides methods of modifying the properties of subterranean strata to increase the resistance of the strata to shear failure which meet the needs described above and overcome the deficiencies of the prior art. The methods basically comprise the steps of preparing a hardenable epoxy composition having flexibility upon hardening such as an epoxide containing liquid selected from the group of diglycidyl ethers of 1,4-butanediol, neopentyl glycol and cyclohexane dimethanol and a hardening agent selected from the group of aliphatic amines and carboxylic acid anhydrides, pumping the epoxy composition into a subterranean stratum by way of the well bore penetrating it and by way of the porosity of the stratum and then allowing the epoxy composition to harden in the stratum.

Upon hardening, the resulting flexible epoxy composition reduces the permeability of the stratum and increases its resistance to shear failure adjacent to the well bore whereby the fracture gradient of the stratum is appreciably increased. The increase in the fracture gradient allows conventional hydraulic cement compositions and other well treatment fluids to be utilized in the well bore without fracturing and lost circulation problems occurring.

It is, therefore, a general object of the present invention to provide methods of modifying the properties of subterranean strata including increasing the strata's resistance to shear.

Other and further objects, features and advantages of the present invention will be readily apparent to those skilled in the art upon a reading of the description of preferred embodiments which follows.

DESCRIPTION OF PREFERRED EMBODIMENTS

As mentioned above, oil, gas and water wells are often drilled into subterranean strata having high permeabilities and low resistances to shear failure. When conventional well fluids enter such strata by way of the well bores penetrating them, the fracture gradients of the strata can often be exceeded. As a result, fractures are formed in the strata and the fluids are lost therein. In many cases, the fracture gradients of such strata are so low that wells drilled into the strata cannot be completed and must be abandoned. The term "fracture gradient" is used herein to mean the graduation in hydraulic pressure required to be exerted in a subterranean stratum over its depth to cause fractures therein.

By the present invention, methods of modifying the properties of subterranean strata penetrated by well bores to reduce their permeabilities and increase their fracture gradients are provided. The methods of the present invention basically comprise the steps of preparing a hardenable epoxy composition which has a viscosity such that it will enter the porosity of the subterranean stratum to be strengthened and which has flexibility upon hardening whereby the tensile strength and fracture gradient of the stratum are appreciably increased. Once prepared, the epoxy composition is pumped into the subterranean stratum to be strengthened by way of a well bore penetrating the stratum and by way of the porosity of the stratum. Thereafter, the epoxy composition is allowed to harden in the stratum which reduces its permeability and increases its tensile strength and fracture gradient adjacent to the well bore whereby the well bore penetrating the stratum can be completed without fracturing the stratum.

In applications where an epoxy composition having a low viscosity is required in order for the epoxy composition to be able to enter the pores of the stratum to be treated, i.e., a viscosity in the range of from about 10 to about 100 centipoises, an epoxy composition comprised of an epoxide containing liquid and a hardening agent is utilized. While various low viscosity epoxide containing liquids can be used, preferred such liquids are selected from the group of diglycidyl ethers of 1,4-butanediol, neopentyl glycol and cyclohexane dimethanol. A suitable epoxide containing liquid comprised of the diglycidyl ether of 1,4-butanediol is commercially available from the Shell Oil Company of Houston, Tex. under the tradename "HELOXY®67". This epoxide containing liquid has a viscosity at 25° C. in the range of from about 13 to about 18 centipoises, a molecular weight of 202 and a one gram equivalent of epoxide per about 120 to about 130 grams of the liquid. A suitable diglycidyl ether of neopentyl glycol is commercially available from Shell Oil Company under the trade designation "HELOXY®68". This epoxide containing liquid has a viscosity at 25° C. in the range of from about 13 to about 18 centipoises, a molecular weight of 216 and a one gram equivalent of epoxide per about 130 to about 140 grams of the liquid. A suitable diglycidyl ether of cyclohexane dimethanol is commercially available from Shell Oil Company under the trade designation "HELOXY®107". This epoxide containing liquid has a viscosity at 25° C. in the range of from about 55 to about 75 centipoises, a molecular weight of 256 and a one gram equivalent of epoxide per about 155 to about 165 grams of the liquid.

A variety of hardening agents, including, but not limited to, aliphatic amines, aliphatic tertiary amines, aromatic amines, cycloaliphatic and heterocyclic amines, amido amines, polyamides, polyethyl amines and carboxylic acid anhydrides can be utilized with the above described epoxide containing liquids. Examples of suitable aliphatic amines are triethylenetetramine, ethylenediamine, N-cocoalkyltrimethylene, isophorone diamine, N-aminopethyl piperazines, imidazoline, and 1,2-diaminecyclohexane. Examples of suitable carboxylic acid anhydrides are methyltetrahydrophtalic anhydride, hexahydrophthalic anhydride, maleic anhydride, polyazelaic polyanhydride and phthalic anhydride. Of these, triethylenetetramine, ethylenediamine, N-cocoalkyltrimethylene and isophorone diamine are preferred, with isophorone diamine being the most preferred. The hardening agent utilized is generally included in the epoxy composition in an amount in the range of from about 15% to about 31% by weight of the epoxide containing liquid in the composition, most preferably about 25%.

In certain applications where particulate bridging materials are required to fill natural fractures and the like, fillers such as crystaline silicas, amorphous silicas, clays, calcium carbonate or barite can be included in the epoxy composition. When such a filler is utilized, it is generally present in the composition in an amount in the range of from about 15% to about 30% by weight of the composition.

Once prepared, the above described epoxy composition comprised of an epoxy containing liquid and a hardening agent is pumped into the subterranean stratum to be strengthened by way of the well bore and by way of the porosity of the stratum and then allowed to harden in the stratum. After the epoxy composition has hardened whereby the permeability of the stratum is reduced and the tensile strength and fracture gradient thereof are increased adjacent to the well bore, conventional well completion operations such as primary cementing are conducted.

In applications where a higher viscosity epoxide resin composition can be used, i.e., a viscosity in the range of from about 90 to about 120 centipoises, an epoxide resin composition comprised of an epoxy resin, an epoxide containing liquid and a hardening agent is utilized. While various epoxy resins can be used, preferred such resins are those selected from the condensation products of epichlorohydrin and bisphenol A. A particularly suitable such resin is commercially available from the Shell Oil Company under the trade designation "EPON® RESIN 828". This epoxy resin has a molecular weight of 340 and a one gram equivalent of epoxide per about 180 to about 195 grams of resin.

An epoxide containing liquid, preferably of one of the types described above, i.e., an epoxide containing liquid selected from the group of diglycidyl ethers of 1,4-butanediol, neopentyl glycol and cyclohexane dimethanol, is utilized to modify the viscosity of the epoxy resin used and add flexibility to the resulting composition after hardening. The epoxide containing liquid is included in the epoxy resin composition in an amount in the range of from about 15% to about 40% by weight of the epoxy resin in the composition, most preferably in an amount of about 25%.

The hardening agent is preferably selected from the group of aliphatic amines and acid anhydrides set forth above, with ethylene diamine, N-cocoalkyltrimethylene and isophorone diamine being preferred. The most preferred hardening agent is isophorone diamine. The hardening agent is included in the epoxy resin composition in an amount in the range of from about 5% to about 25% by weight of the composition, preferably in an amount of about 20%.

As mentioned above in connection with the low viscosity epoxy composition, the higher viscosity epoxy resin composition can include a filler such as crystalline silicas, amorphous silicas, clays, calcium carbonate or barite. When used, the filler is present in the composition in an amount in the range of from about 15% to about 30% by weight of the composition.

The above described epoxy resin composition can be dispersed in an aqueous carrier liquid to enhance the ability of the composition to enter the porosity of water wet strata. To facilitate preparing the aqueous dispersion, a water borne epoxy resin which is commercially available from the Shell Oil Company under the trade designation "EPI-REZ®" can be utilized. The epoxide containing liquid and hardening agent used with the epoxy resin can be dispersed or dissolved in the water borne epoxy resin to form an aqueous dispersion of the epoxy resin composition.

In order to further illustrate the methods and compositions of this invention, the following examples are given.

EXAMPLE 1

Sandstone cores with and without a hardened epoxy composition and the hardened epoxy composition alone were tested for compressive strength, tensile strength, Young's Modulus and Poisson's Ratio, all in accordance with the standardized tests and procedures of the American Society for Testing and Materials (ASTM) set forth, for example, in ASTM § D1456. The test apparatus used is described in U.S. Pat. No. 5,325,723 issued to Meadows, et al. on Jul. 5, 1994. All of the tests were conducted under a confining pressure of 1000 psig. Young's Modulus and Poisson's Ratio describe the elastic properties of the tested samples.

The tests were conducted using a sandstone core alone, a hardened epoxy composition alone and a sandstone core after it was saturated with an epoxy composition and the epoxy composition was allowed to harden for a time of three days at a temperature of 140° F. The epoxy composition used in the tests was comprised of the diglycidyl ether of neopentyl glycol and a isophorone diamine hardening agent present in the composition in an amount of about 20% by weight of the diglycidyl ether.

The results of these tests are given in Table I below.

TABLE I

STRENGTH AND ELASTICITY TESTS[1]

| Material Tested | Compressive Strength, psi | Tensile Strength, psi | Young's Modulus ($E \times 10^6$) | Poisson's Ratio |
|---|---|---|---|---|
| Sandstone Alone | 10,434 | 417 | 1.556 ± 0.0023 | 0.357377 ± 0.003519 |
| Hardened Epoxy Composition[2] Alone | 11,743 | 2,980 | 0.418 ± 0.0003 | 0.481125 ± 0.001567 |
| Sandstone Saturated with Hardened Epoxy Composition | 23,794 | 2,770 | 2.092 ± 0.0084 | 0.110611 ± 0.002495 |

[1]The confining pressure was 1000 psig.
[2]Shell Oil Co. "HELOXY ® 68" epoxide containing liquid with 23% by weight isophorone diamine hardening agent.

From Table I it can be seen that the sandstone core saturated with hardened epoxy resin had excellent compressive and tensile strengths as well as elasticity.

EXAMPLE 2

Water permeability tests were conducted in accordance with the procedures and apparatus set forth and described in the American Petroleum Institute (API) *Recommended Practice For Core Analysis Procedure,* API RP 40. Sandstone cores treated with various hardened epoxy compositions, the compositions alone and a sandstone core alone were tested. The various epoxy compositions used in the tests are set forth in Table II below and the results of the tests are set forth in Table III below.

TABLE II

EPOXY COMPOSITIONS

| | | COMPOSITION | | COMPONENTS | |
|---|---|---|---|---|---|
| Composition Designation | Epoxy Resin | % by weight of composition | Epoxide Containing Liquid | % by weight of composition | Hardening Agent | % by weight of composition |
| A | None | — | Diglycidyl ether[1] of 1,4-butanediol | 76.4 | Isophorone Diamine | 23.6 |
| B | None | — | Diglycidyl ether[2] of neopentyl gylcol | 79.3 | Isophorone Diamine | 20.7 |
| C | None | 56.1 | Diglycidyl ether[3] of cyclohexane dimethanol | 37.4 | Triethylenetetramine | 6.5 |
| D | Condensation product[4] of epichlorohydrin and bisphenol A | 70.1 | Diglycidyl ether[4] of 1,4-butanediol | 23.4 | Triethylenetetramine | 6.5 |

[1]Shell Oil Co. "HELOXY ® 67"
[2]Shell Oil Co. "HELOXY ® 68"
[3]Shell Oil Co. "HELOXY ® 107"
[4]Shell Oil Co. "EPON ® 67"

TABLE III

PERMEABILITY TESTS

| Core No. | Core Material | Saturated with Hardened Epoxy Composition | Epoxy Composition Used | Test Liquid Used | Test Pressure, psig | Flow rate, ml/min | Permeability, md |
|---|---|---|---|---|---|---|---|
| 1 | Sandstone | No | — | Fresh Water | 165 | 5 | 908.6 |
| 2 | Sandstone | Yes | A[1] | Fresh Water | 1000 | 0 | >0.001 |
| 3 | Sandstone | Yes | B[2] | Fresh Water | 1000 | 0 | >0.001 |
| 4 | Sandstone | Yes | C[3] | Fresh Water | 1000 | 0 | >0.001 |
| 5 | Sandstone | Yes | D[4] | Fresh Water | 1000 | 0 | >0.001 |
| 6 | Hardened Epoxy Composition | — | A[1] | Fresh Water | 1000 | 0 | >0.001 |
| 7 | HardenedEpoxy Composition | — | B[2] | Fresh Water | 1000 | 0 | >0.001 |
| 8 | Hardened Epoxy Composition | — | C[3] | Fresh Water | 1000 | 0 | >0.001 |

[1]76.4% by weight Shell Oil Co. "HELOXY ® 68" epoxide containing liquid and 23.6% by weight hardening agent.
[2]79.3% by weight Shell Oil Co. "HELOXY ® 107" epoxide containing liquid and 20.7% by weight hardening agent.
[3]56.1% by weight Shell Oil Co. "EPON ® 828" epoxy resin, 37.4 % by weight "HELOXY ® 67" epoxide containing liquid and 6.5% by weight hardening agent.
[4]70.1% by weight Shell Oil Co. "EPON ® 828" epoxy resin, 23.4% by weight "HELOXY ® 67" epoxide containing liquid and 6.5% by weight hardening agent.

From Tables II and III it can be seen that the epoxy compositions utilized in accordance with this invention effectively reduce the permeability of subterranean strata materials.

Thus, the present invention is well adapted to carry out the objects and obtain the features and advantages mentioned as well as those which are inherent therein. While numerous changes may be made by those skilled in the art, such changes are encompassed within the spirit of this invention as defined by the appended claims.

What is claimed is:

1. A method of modifying the properties of a subterranean stratum penetrated by a well bore to thereby increase its resistance to shear failure comprising the steps of:
    (a) preparing a hardenable epoxy composition having a viscosity at 25° C. in the range of from about 10 to about 100 centipoises and having flexibility upon hardening comprising an epoxide containing liquid and a hardening agent;
    (b) pumping said epoxy composition into said subterranean stratum by way of said well bore and by way of the porosity of said stratum; and
    (c) allowing said epoxy composition to harden in said stratum.

2. The method of claim 1 wherein said epoxide containing liquid is selected from the group of diglycidyl ethers of 1,4-butanediol, neopentyl glycol and cyclohexane dimethanol.

3. The method of claim 1 wherein said hardening agent is selected from the group of aliphatic amines and anhydrides.

4. The method of claim 1 wherein said hardening agent is selected from the group of triethylenetetramine, ethylene diamine, N-cocoalkyltrimethylene and isophorone diamine and is present in said composition in an amount in the range of from about 15% to about 31% by weight of said epoxide containing liquid in said composition.

5. The method of claim 1 wherein said hardening agent is isophorone present in said composition in an amount of about 25% by weight of said epoxide containing liquid in said composition.

6. The method of claim 1 wherein said epoxy composition further comprises a filler selected from the group consisting of crystalline silicas, amorphous silicas, clays, calcium carbonate and barite.

7. A method of modifying the properties of a subterranean stratum penetrated by a well bore to thereby reduce its permeability and increase its resistance to shear failure comprising the steps of:
    (a) preparing a hardenable epoxy resin composition having a viscosity at 25° C. in the range of from about 90 to about 120 centipoises and having flexibility upon hardening comprising an epoxy resin selected from the condensation products of epichlorohydrin and bisphenol A, an epoxide containing liquid and a hardening agent;
    (b) pumping said epoxy resin composition into said subterranean stratum by way of said well bore and by way of the porosity of said stratum; and
    (c) allowing said epoxy resin composition to harden in said stratum.

8. The method of claim 7 wherein said epoxy resin has a molecular weight of 340 and a one gram equivalent of epoxide per about 180 to about 195 grams of resin.

9. The method of claim 7 which further comprises dispersing said hardenable epoxy resin composition in an aqueous carrier liquid.

10. The method of claim 7 wherein said epoxide containing liquid is selected from the group of diglycidyl ethers of 1,4-butanediol, neopentyl glycol and cyclohexane dimethanol and is present in said composition in an amount in the range of from about 15% to about 40% by weight of said epoxy resin in said composition.

11. The method of claim 7 wherein said epoxide containing liquid has a molecular weight in the range of from about 200 to about 260 and a one gram equivalent of epoxide per about 120 to about 165 grams of said liquid.

12. The method of claim 7 wherein said hardening agent is selected from the group of ethylene diamine, N-cocoalkyltrimethylene and isophorone diamine.

13. The method of claim 7 wherein said hardening agent is present in said composition in an amount in the range of from about 5% to about 25% by weight of said composition.

14. The method of claim 7 wherein said epoxide containing liquid is selected from the group of diglycidyl ethers of 1,4-butanediol, neopentyl glycol and cyclohexane dimethanol and is present in said composition in an amount of about 25% by weight of said epoxy resin in said composition.

15. The method of claim 7 wherein said hardening agent is isophorone diamine and is present in said composition in an amount of about 20% by weight of said composition.

16. The method of claim 7 wherein said epoxy resin composition further comprises a filler selected from the group consisting of crystalline silicas, amorphous silicas, clays, calcium carbonate and barite.

17. The method of claim 7 wherein said filler is present in said composition in an amount in the range of from about 15% to about 30% by weight of said composition.

18. A method of modifying the properties of a subterranean stratum penetrated by a well bore to thereby reduce its permeability and increase its resistance to shear failure comprising the steps of:
    (a) preparing a hardenable epoxy resin composition having a viscosity at 25° C. in the range of from about 90 to about 120 centipoises and having flexibility upon hardening comprising an epoxy resin selected from the condensation products of epichlorohydrin and bisphenol A, an epoxide 15 containing liquid selected from the group of diglycidyl ethers of 1,4-butanediol, neopentyl glycol and cyclohexane dimethanol present in said composition in an amount in the range of from about 15% to about 40% by weight of said epoxy resin in said composition and a hardening agent selected from the group of ethylenediamine, N-cocoalkyltrimethylene and isophorone diamine present in said composition in an amount in the range of from about 5% to about 25% by weight of said composition;
    (b) pumping said epoxy resin composition into said subterranean stratum by way of said well bore and by way of the porosity of said stratum; and
    (c) allowing said epoxy resin composition to harden in said stratum.

19. The method of claim 18 which further comprises dispersing said hardenable epoxy resin composition in an aqueous carrier liquid.

20. The method of claim 19 wherein said epoxy resin composition further comprises a filler selected from the group consisting of crystalline silicas, amorphous silicas, clays, calcium carbonate and barite.

* * * * *